Figures 1, 2, 3, 9:
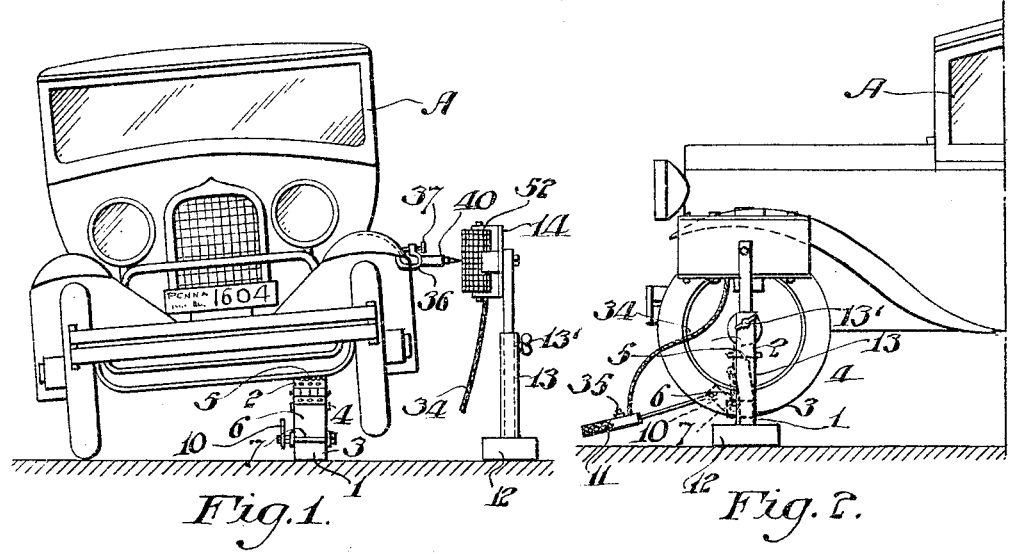

Dec. 20, 1932. S. W. WIDNEY 1,891,613
METHOD OF AND APPARATUS FOR TESTING THE RIDING QUALITIES OF VEHICLES
Filed Oct. 23, 1930  2 Sheets-Sheet 1

Inventor:
Stanley W. Widney,
By [signature]
Attorney.

Dec. 20, 1932.  S. W. WIDNEY  1,891,613
METHOD OF AND APPARATUS FOR TESTING THE RIDING QUALITIES OF VEHICLES
Filed Oct. 23, 1930   2 Sheets-Sheet 2
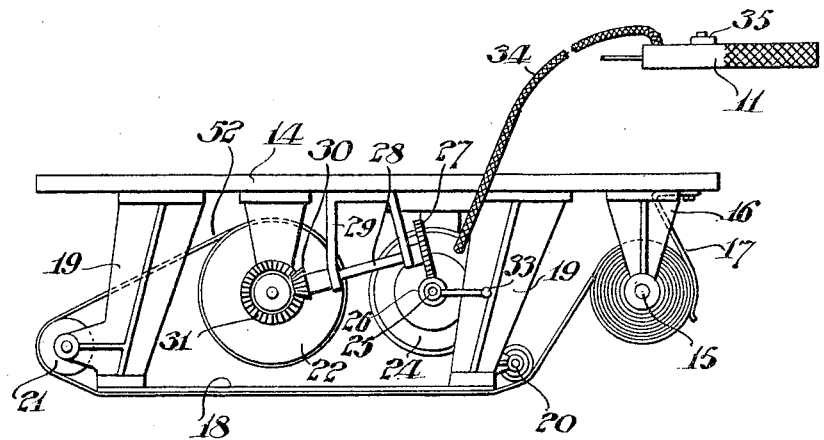
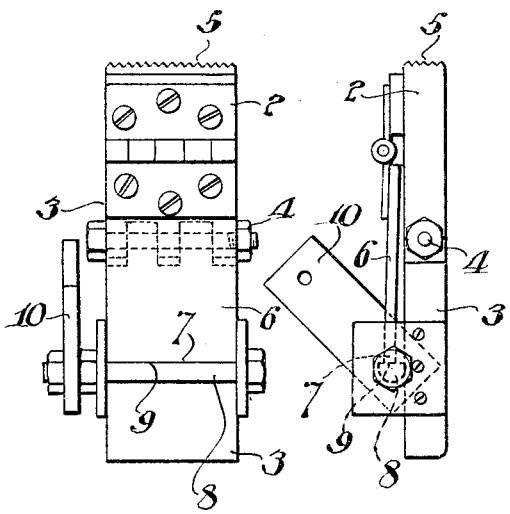
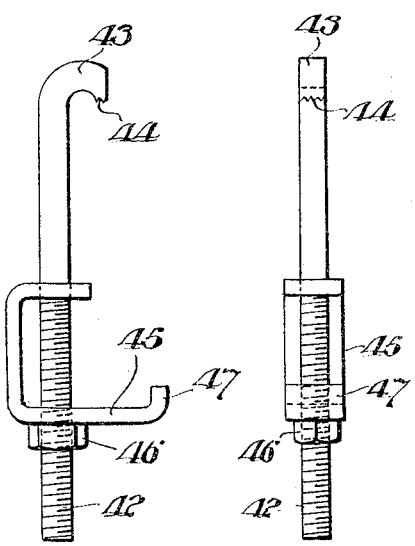
Fig. 4.
Fig. 5.   Fig. 6.   Fig. 7.   Fig. 8.
Inventor
Stanley W. Widney,
By [signature]
Attorney.

Patented Dec. 20, 1932

1,891,613

UNITED STATES PATENT OFFICE

STANLEY W. WIDNEY, OF PHILADELPHIA, PENNSYLVANIA, ASSIGNOR TO RIDE-O-GRAPH CORPORATION, A CORPORATION OF DELAWARE

METHOD OF AND APPARATUS FOR TESTING THE RIDING QUALITIES OF VEHICLES

Application filed October 23, 1930. Serial No. 490,610.

My invention is a method of and apparatus for testing the riding qualities of vehicles to indicate how the springs, shackles, shock absorbers and tires operate in assembled relation, and by which there may be shown further how the respective parts operate individually.

By my improvements there may be charted the actual actions or movements of an automobile chassis at any of its four suspended points as the result of a given bump to a wheel of the car, and complete, accurate, graphic and permanent data covering the action of all the shock absorbing units may be secured. By my improvements there may be determined the magnitude of each movement, the time consumed in absorbing the shock and the exact action of a tire, wheel, axle, spring or shock absorber.

It has heretofore been sought to test the riding qualities of vehicles by making tests while the car was in motion over a road or the like, but tests made while a car is in motion introduces unavoidable variables rendering impracticable the standardization of tests.

In accordance with my invention, the riding qualities of a vehicle are tested by dropping a car from a position of rest so that any car may be tested under identical conditions and any differences shown in the charted results may be definitely ascribed to actual differences in the mechanism under test. By a comparison of such differences with a standard graph for the type of car being tested the causes of the variations may be readily ascertained and rectified.

In accordance with my invention, the amplitude and duration of vibrations resulting from the dropping of the car are recorded upon a chart movable at a predetermined speed by a marker connected with and operated by a suitable part of the vehicle, such as a fender or wheel hub. The car is dropped a predetermined distance, hence the wheel is given a known impact which causes the spring to compress and subsequently expand. The movements resulting therefrom are recorded on a chart moving at a precisely timed rate of speed so as to show not only the extent of all vertical motions but also their period to a small fractional part of a second and the rate of deceleration and acceleration at any moment. Definite known impacts are preferably delivered to each wheel separately, then to both front wheels simultaneously and then to both rear wheels and separate tests of different parts of the vehicle under the impact of different drops may be made by connecting the marker with a fender, hub, or other vehicle part. From the readings of the graphs thus procured a definite and accurate indication of the efficiency of each shock absorbing unit may be secured.

The discomfort caused passengers in a vehicle by chassis action is largely proportional to the rate at which the chassis decelerates and accelerates at the compression and rebound points, and the sharper the curve produced on the chart at these points the greater is the discomfort to the rider. By so adjusting the vehicle parts as to produce gradual and rounding curves on the graph at the compression and rebound points, greater comfort may be secured.

The characteristic features and advantages of my invention will further appear from the following description and the accompanying drawings in illustration thereof.

In the drawings, Fig. 1 is a front elevation illustrating apparatus embodying my improvements positioned for the practice of my method in juxtaposition to an automobile; Fig. 2 is a side elevation of the apparatus shown in Fig. 1; Fig. 3 is an enlarged front elevation of the chart supporting means embodied in my invention; Fig. 4 is a top plan view of the chart operating means; Fig. 5 is a front elevation of a collapsing jack for dropping the vehicle; Fig. 6 is a side elevation of the jack shown in Fig. 5; Fig. 7 is an elevation of a spring chassis clamp; Fig. 8 is an elevation of a spring chassis clamp taken transversely to the view shown in Fig. 7 and Figure 9 is an enlarged part sectional elevation of a detached marker and holder therefor.

As illustrated in the drawings, a vehicle A is supported by a collapsible jack 1 comprising toggle link members 2 and 3 pivotally connected by a bolt 4; the section 2 having a corrugated face 5 for engaging an axle or frame member of the vehicle. A plate 6 is hinged to the section 2 and its free edge 7 is adapted for engagement with the flat surface 9 of a shaft 8. The shaft has fixed thereto an arm 10 for the attachment of a handle 11 having a hooked end for engagement in an aperture in the handle.

The car may be elevated for the insertion of the jack thereunder by any suitable means, and when the weight of the car rests upon the corrugated surface 5 the edge 7 of the plate 6 rests upon the shaft surface 9 and is supported thereby. The length of the plate 6 preferably is such that the members 2 and 3 are slightly inclined relatively to one another to facilitate the collapse of the jack at the joint. When the handle 11 is pulled, the arm 10 rocks the shaft 8 so that the plate 6 is deflected therefrom and the car A drops a predetermined distance.

The amplitude, duration and character of the vibrations resulting from the dropping of the car is indicated and recorded by a charting mechanism comprising a base 12 having fixed thereto a standard 13 composed of telescopic sections which may be fixed in adjusted position by the thumb nut 13'. A frame 14 is supported by the standard 13 and has a chart carrying roller 15 journalled in the brackets 16 thereof. A spring retarder 17 is fixed to the frame and bears against a roll of chart paper wound on the roller 15. A face plate 18 is supported by arms 19 fixed to the frame member 14, and rollers 20 and 21 are journalled in bearings on the arms 19 at the opposite ends of the face plate 18.

A drum 22, journalled in brackets 23 fixed to the frame member 14, is rotated at a constant speed by an electric motor 24 fixed to the frame member 14. The shaft 25 of the motor has fixed thereon a worm 26 which engages and rotates a worm wheel 27 fixed on a shaft 28 journalled in bearings of a bracket 29. A miter gear 30, fixed on the end of the shaft 28, meshes with a miter gear 31 fixed on the drum 22. A handle 33 may be fixed on an extension of the motor shaft 25 for manually adjusting the position of the drum 22. The motor may be supplied with current through conductors housed in a cable 34 and controlled by a suitable push button switch 35 which may be conveniently set in or adjacent to the hand piece of the handle 11.

A C-clamp 36, having a thumb screw 37 for the engagement of a fender or other vehicle part, is provided with a tubular sleeve 38. A coil spring 39 is housed within the sleeve 38 and tends to press outwardly a marker 40, which is adapted to be yieldingly pressed against a chart moving over the face plate 18 when the chart mechanism is positioned adjacent to the vehicle fender or other part to which the marker is attached.

As shown in Figs. 7 and 8 there may be provided a spring chassis clamp consisting of a threaded bolt 42 having a bent head 43 provided with a corrugated edge 44. A yoke 45 having its arms apertured is movable axially on the bolt 42 and is adjustable and positioned thereon by the nut 46. The lower arm of the yoke 45 has an upturned end 47.

The chart used in connection with my invention preferably consists of a long strip of cross ruled paper 52 having a datum line 53 adjacent to the middle thereof, the horizontal lines on the chart preferably being numbered to indicate inches or other units of measurement and the spaces between the vertical lines representing hundredths of a second at the speed at which the motor moves the chart beneath the marker. The end of the chart is secured to or wrapped around the drum 22 so that the rotation of such drum draws the chart strip from the roller 15 and over the plate 18 at a constant speed.

In the operation of my apparatus and the practice of my method, the base 12 is set adjacent to the vehicle to be tested and the clamp or bracket 36 is clamped to the fender directly above the hub, to the hub or to other appropriate part of the vehicle. The standard sections 13 are so adjusted and fixed that the marker point of the marker 40 stands on the datum line of the chart.

The vehicle is then elevated a predetermined distance, by any suitable means, for instance, an ordinary jack, until the collapsing device 1 can be inserted under the lifted axle or other chassis member. The device 1 is held in its expanded position by the engagement of the edge 7 with the flat surface 9 of the shaft 8 and the car is lowered to rest upon the corrugated surface 5. The lifting jack is then removed. The collapsing jack 1 may be so positioned under an axle as to elevate above ground either one or both wheels connected with such axle, and preferably tests are made by lifting and dropping each wheel individually and also by lifting and dropping the wheels in pairs.

When the operator is ready to make the test, he closes the switch 35 which causes the motor 24 to rotate the drum 22 and translate the chart over the surface 18 at a predetermined speed such that the vertical lines on the chart pass under the marker at a known rate, which may be indicated on the chart. When the chart is moving at the desired predetermined speed, the handle 11 is pulled. This turns the shaft 8 and deflects the plate 6 outwardly which causes the joint between the members 2 and 3 to break and the vehicle to drop suddenly from a position of rest. The impact of the dropped wheel with the ground sets up vibrations in the vehicle which are transmitted to the marker 40 and thereby recorded on the record receiver formed by the chart. The marker thus draws on the chart a graph showing the period and total time of oscillation, velocity at any instant, the amplitude of the vibrations, the duration of the vibrations and the rate of acceleration and deceleration at any point.

As the rate of deceleration and acceleration immediately before and after the ends of the compression and rebound movements are of particular importance in determining the riding qualities of a vehicle, the record will indicate what corrections are required in the mechanism of the vehicle.

If it is desired to simulate a bump to a wheel caused by a raised interruption in the road, with the body load on the spring assembly, the yoke arm 45 may be engaged under the spring in front or back of the vehicle axle and the head 44 hooked over the lower edge of a chassis channel member. By adjusting the nut 46, the yoke may be positioned to hold the axle and the unsprung weight to the chassis in body load position when the chassis is lifted. Upon the dropping of the vehicle, its spring is compressed when the wheel strikes the ground and the yoke drops off, thereby permitting the spring assembly of the vehicle to function freely and with no resistance. The resulting vibrations are recorded on the chart.

By tightening up on the nut 46 so as to compress the vehicle spring, there may be simulated a condition where a vehicle wheel encounters a second raised interruption in the road before the vehicle spring has had opportunity to regain a state of equilibrium after a previous bump. When the vehicle is dropped, its spring is further compressed and the yoke liberated, and the subsequent vibrations of the released spring are recorded upon the chart to illustrate the effect of a road bump upon a partially compressed vehicle spring.

Having described my invention, I claim:

1. The method of testing the riding qualities of a vehicle having a running gear and a body spring-supported from the running gear, which consists in dropping the vehicle from a position of rest until a portion of its running gear contacts with an impact receiving surface, and determining the amplitude and duration of vibrations imparted to the body.

2. The method of testing the riding qualities of vehicles having spring supported bodies which consists in securing the spring members in body load position, dropping the vehicle and releasing the spring members by impact, and charting the vibrations resulting from such impact.

3. The method of testing the riding qualities of vehicles having a spring supported body which consists in compressing the spring members, dropping the vehicle a predetermined distance and releasing the spring members from compression by impact, and charting the vibrations resulting from such impact.

4. Apparatus for testing the riding qualites of vehicles which consists of means for holding the vehicle in an elevated position of rest, said means having quick acting mechanism for dropping said vehicle from its position of rest, a record receiver, and a marker connected with said vehicle and coacting with said receiver to mark thereon a record of the vibrations resulting from the dropping of said vehicle.

5. Apparatus for testing the riding qualities of vehicles which consists of means for dropping a vehicle from a position of rest, a marker connected with said vehicle, a record receiver, and means for moving said record receiver in contact with said marker during the vibrations resulting from said drop.

6. Apparatus for testing the riding qualities of vehicles which consists of a record receiver having thereon indicators of distance and time, means for moving said record receiver at a predetermined rate in consonance with the time indications thereon, a marker contacting with said record receiver during the movement thereof, means for connecting said marker with a vehicle, and means for vibrating said vehicle from a position of rest.

7. Apparatus for testing the riding qualities of vehicles comprising a chart having groups of cross lines thereon, one of said groups of lines indicating distance and the other of said groups of lines indicating time, means for moving said chart at a rate consonant with the time indications thereon, a marker contacting with said chart during the movements thereof, means connecting said marker with a vehicle, and means having quick release mechanism for dropping said vehicle and vibrating said marker as a result of the impact of said car.

8. Apparatus for testing the riding qualities of vehicles which consists of a movable chart, a marker contacting with said chart during the movement thereof, means connecting said marker with the vehicle, means for dropping said vehicle from a position of rest, and a clamp for positioning a spring of said vehicle during its movement from its position of rest, said clamp being detachable by the impact resulting from said drop.

In testimony whereof I have hereunto set my hand this 17th day of October, 1930.

STANLEY W. WIDNEY.